United States Patent Office 3,562,112
Patented Feb. 9, 1971

3,562,112
PRODUCTION OF OPTICALLY
ACTIVE ANTIPODES
Heinz Gibian, Klaus Kieslich, Hans-Joachim Koch, Horst Kosmol, Clemens Rufer, Eberhard Schröder, and Rosemarie Vössing, Berlin, Germany, assignors to Schering A.G., Berlin, Germany
No Drawing. Filed Sept. 13, 1966, Ser. No. 578,996
Claims priority, application Germany, Sept. 14, 1965, Sch 37,715
Int. Cl. C07c 167/00; C12d 13/00, 13/06
U.S. Cl. 195—51                    28 Claims

ABSTRACT OF THE DISCLOSURE

A process for the production of optically active compounds, such as intermediates for the production of steroid hormones, which comprises subjecting an optically inactive compound of the formula:

wherein $C_1$ is a symmetric carbon atom; X is H or loweralkyl; Z and Z are a pair of identical groups, separate or joined together, each bearing a functional group convertible to another functional group; and Y is the remainder of the organic molecule; to the microbiological enzyme system of a bacteria, fungi or yeast, thereby converting the functional group of one Z to another functional group, thus converting the $C_1$ optically inactive carbon atom into a $C_a$ optically active carbon atom.

---

This invention relates to the production of optically active antipodes by the microbiological and/or enzymatic conversion of a symmetrical carbon atom of an organic compound into an asymmetrical carbon atom, and to certain novel products produced thereby.

Many pharmacologically active substances, such as cocaine, the 1-tropic acid of 1-hyoscyamine and scopolamine, α-aminoacids, steroid hormones, steroid alkaloids, cardiac glycosides, substituted malonic ester derivatives, and 1,3,5(10),8(9),14-estrapentaene-3,17β - diol - 3 - methyl ether, as well as the intermediate compounds used in their production contain one or more asymmetrical carbon atoms. Moreover, clinical tests with these therapeutic agents almost always reveal that only one enantiomeric or diastereomeric form possesses the desired pharmacological effect, and that the racemate thereof generally shows at most half the effectiveness. Since the opposite form may even exhibit undesired side effects, it is desirable to obtain the optically active antipode in a pure state.

When purely chemical methods are used in syntheses of optical antipodes of such above-mentioned active substances, or in the synthesis of suitable optically active intermediate compounds, there is, however, usually obtained a racemic mixture of these compounds. To obtain the therapeutic substance in its most effective form, the racemic mixture is separated into its respective D and L forms, thus resulting in an inevitable loss of at least 50% of theory. In those cases where not only one, but several optically active centers are produced in the course of this synthesis, the above-described difficulties are compounded even further. Consequently, the over-all yield of the desired optical antipodes of therapeutic compounds has been much less than desired, and the cost of producing these compounds is extremely high and in some cases prohibitive. It is, therefore, of considerable importance to find a more satisfactory method of producing from an optically inactive compound the desired diastereomeric form of the ultimate therapeutic agent in a relatively pure state.

It is, therefore, a principal object of this invention to provide an improved method for the conversion of an optically inactive organic compound into an optically active antipode.

A further object of this invention is to provide an improved method of converting an organic compound having an optically inactive carbon atom into an optically active antipode of a relatively pure state.

An additional object of this invention is to provide an improved process for the selective conversion of only one of two identical substituents attached to an asymmetrical carbon atom in an organic compound.

Another object of this invention is the provision of such a method whereby an optically active antipode of a steroid is produced in a relatively pure state.

Still another object of this invention is to provide novel products which are of unique utility in the preparation of valuable enantiomeric forms of steroid compounds.

Upon further study of the specification and claims, other objects and advantages of the present invention will become apparent.

To attain the objects of this invention, it has been surprisingly discovered that an organic compound having a symmetrical carbon atom with two identical substituents thereon can be used in forming an optically active antipode by the selective microbiological and/or enzymatic conversion of one of the two identical substituents. In the course of the reaction, the carbon atom of the substituent on which the reaction takes place can itself also become an asymmetrical carbon atom of an optically active antipode. Because of the surprising selectivity of the fermentation systems described herein for only one of the two identical reactive groups of the compound, an optically inactive carbon atom which is removed from the reaction center can also be converted into an optically active carbon atom.

The method of the present invention provides a novel route for producing optically active antipodes having one or more asymmetrical centers of Formula I, as follows:

   (I)

wherein:

$C_a$ represents an asymmetrical carbon atom of an optically active antipode having four different substituents on its four valences;

X represents hydrogen, halogen, a free, esterfied, or etherfied hydroxyl group, a free or functionally converted amino group, or an organic residue having at least one carbon atom;

Y represents an organic residue having at least one carbon atom, or Y together with Z or with Z' forms a cyclic residue which can contain a hetero atom;

Z represents an organic residue having at least one carbon atom, COOH, or Z together with Z' forms a cyclic residue which can contain a hetero atom;

Z' represents an organic residue having at least one carbon atom, or a hydrogen atom when Z is a COOH group, or Y together with either Z or Z' can represent a cyclic residue which can have in the ring a hetero atom, with the provision that when X, Y, Z, and Z' are organic residues, they are all different.

In the production of these compounds, the present process provides for the microbiological or enzymatic treatment of an optically inactive compound of Formula II:

(II)

wherein:

$C_i$ represents an optically inactive carbon atom;

X and Y each have the previously indicated meanings, with the provision that Y has not undergone a ring closure with Z; and Z represents identical substituents, each of which contains at least one carbon atom, and has at least one modifiable group, with the provision that the modifiable group on one of the moieties Z is selectively and preferentially modifiable microbiologically and/or enzymatically transformable to Z', to produce the desired optical antipode.

The optically active antipode thus produced can, if desired, be cyclized in a stereospecific manner via the substituents Y and Z or Z' by conventional chemical methods, preferably after other reactive groups in the molecule are masked to prevent the reaction thereof.

The substituent Y is desirably a saturated or unsaturated aliphatic or cyclic hydrocarbon residue which can, if desired, be interrupted by hetero atoms, such as, for example, oxygen, nitrogen or sulphur atoms. The hydrocarbon residue can additionally be substituted by halogen atoms, free or functionally modified keto, hydroxyl, carboxyl, or amino groups. It is particularly desirable to employ as the Y substituent an alkyl having 1 to 20, preferably 3 to 12 carbon atoms and 0 to 6, preferably 0 to 2 double or triple bonds; cycloalkyl having 3 to 20, preferably 5 to 12 carbon atoms; aralkyl having in the alkyl portion 1 to 10, preferably 1 to 4 carbon atoms, and in the aryl portion 6 to 18, preferably 6 to 12 carbon atoms; aryl having 6 to 18, preferably 6 to 12 carbon atoms and 1 to 4 rings; heterocyclic compounds containing up to 4 hetero atoms selected from the group consisting of oxygen, nitrogen and sulphur atoms and containing 3 to 20, preferably 3 to 14 carbon atoms and 1 to 4 rings.

The functionally modified keto, hydroxy, and carboxyl groups include: ester, ether, ketal, acetal groups, and hydrazones, oximes, semicarbazones, enamines.

Suitable functionally modified amino groups include acylamines, alkylamines, enamines.

It is preferred to employ as the hydrocarbon residues those which are substituted by a cyclic hydrocarbon residue, or a residue capable of undergoing ring closure reaction with the formation of a condensed ring system. Preferred examples of the latter residues are those of Formulae III to IX, as follows:

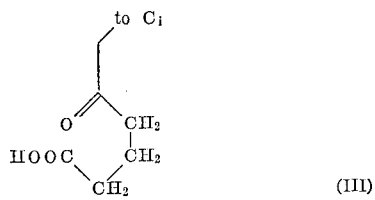

(III)

wherein the carboxyl group or carbonyl group can also be present in a functionally altered form;

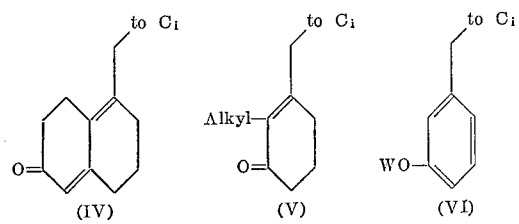

(IV)  (V)  (VI)

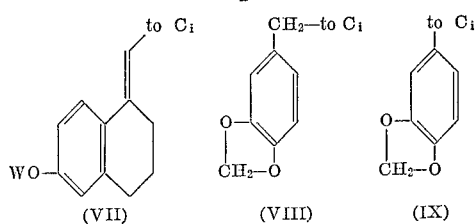

(VII)  (VIII)  (IX)

wherein W is a hydrogen atom or preferably an alkyl or acyl residue which can, if desired, be additionally substituted or interrupted by hetero atoms.

The substituent X can be any radical which is not preferentially reacted with the organism employed. Preferably, X is hydrogen; halogen; free or functionally modified hydroxyl, carboxyl, aldehyde, or amino groups; an aliphatic residue such as straight or branched chain alkyl having 1 to 20, preferably 1 to 12 carbon atoms, and 0 to 5, preferably 0 to 2 double or triple bonds; saturated or unsaturated cyclic residues, such as an alicyclic having 1 to 2 rings, as, for example, cycloalkyl having 3 to 12, preferably 5 to 6 carbon atoms; aryl having 1 to 2 rings and 6 to 12, preferably 6 carbon atoms; and heterocyclic groups, such as, for example oxygen, nitrogen, sulphur atoms.

These aliphatic and cyclic residues can also, if desired, be substituted by halogen, hydroxyl, acyloxy, free or functionally converted carboxyl, carbonyl, or amino groups. The functionally converted forms are, for example, carboxylic acid esters, acetal, alkylamino, or acylamino groups.

Exemplary of the substituent X are, for example:

Hydrogen atom $CH_3(CH_2)_n-$ ($n=0$ to 3)

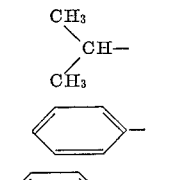

OH

O-acyl

O-mesyl

O-tosyl

Cl atom

F atom

The two substituents Z in Formula II are identical and represent any desired enzymatically modifiable residue which is bonded directly to $C_i$ or indirectly by further carbon atoms, e.g. $-CH_2-$ or cyclic residues which can be interrupted by hetero atoms. The enzymatically modifiable group in Z can be in a treminal or intermediate position, the latter intermediate position, the residual terminal residue can be hydrogen or any other desired organic residue such as straight or branched alkyl residue having 1 to 10, preferably 1 to 4 carbon atoms, and 0 to 3, preferably 0 to 1 double or triple bonds. This alkyl residue can, if desired, be substituted by halogen, hydroxyl, amino, or carboxyl groups in free or functionally converted form.

The enzymatically modifiable residue constituting the whole or any part of the substituent Z can be selected from any one of the functional groups in column 1 of Table 1. In the course of the enzymatic reaction hereafter described, the enzymatically modifiable residue Z is converted to the corresponding radical Z' shown in column 2 by the type of reaction listed in column 3.

TABLE 1

| Microbiologically and/or enzymatically modifiable groups in the starting product, Z | Microbiologically and/or enzymatically modified group in the primary product, Z' | Reaction |
|---|---|---|
| $\diagdown$C=O$\diagup$ | $\diagdown$CHOH$\diagup$ | Reduction. |
| —COOH | —CHO or —CH$_2$OH | Do. |
| $\diagdown$C—NO$_2$$\diagup$ | $\diagdown$C—NH$_2$$\diagup$ | Do. |
| $\diagdown$C=N— | $\diagdown$CHNH— or $\diagdown$CHNH$_2$$\diagup$ | Do. |
| $\diagdown$CHOH$\diagup$ | $\diagdown$C=O$\diagup$ | Oxidation. |
| —CH$_2$OH | —CHO or —COOH | Do. |
| —CHO | —COOH | Do. |
| —COO Alkyl | —COOH | Saponification. |
| —CONH$_2$ | —COOH | Do. |
| $\diagdown$CO·Acyl$\diagup$ | $\diagdown$COH$\diagup$ | Do. |
| $\diagdown$CNH·Acyl$\diagup$ | $\diagdown$CNH$_2$$\diagup$ | Do. |
| $\diagdown$C—OH$\diagup$ | $\diagdown$C—O Acetyl$\diagup$ | Esterification. |
| $\diagdown$C—NH$_2$$\diagup$ | $\diagdown$C—NH Acetyl$\diagup$ | N-acetylation. |
| —COOH | —H | Decarboxylation. |
| —COCOOH | —COOH or —CHO, —CH$_2$OH | Do. |
| $\diagdown$C—NH$_2$$\diagup$ | $\diagdown$C—OH$\diagup$ or optionally $\diagdown$C=O— | Deamination. |
| =C=N— | =C=O | Do. |
| $\diagdown$C—H$\diagup$ | $\diagdown$C—OH$\diagup$ | Hydroxylation. |
| $\diagdown$CH—CH$\diagup$ | $\diagdown$C=C$\diagup$ | Dehydrogenation. |
| $\diagdown$C=C$\diagup$ | $\diagdown$CH—CH$\diagup$ | Hydrogenation. |
| $\diagdown$C—Cl$\diagup$ | $\diagdown$C—OH$\diagup$ | Exchange. |

Note.—(Free valences may optionally denote H).

In a preferred embodiment of the invention, the two substituents Z of Formula II jointly with $C_1$ represent a cyclic residue, preferably a cyclic residue of Formula X, as follows:

(X)

wherein:

$C_1$ represents an optically inactive carbon atom;
Q represents —CH$_2$—CH$_2$— or —CH$_2$—; and
V represents an enzymatically modifiable group having a keto group in the free form or in the form of an oxime, hydrazone or semicarbazone; one of the substituents V is selectively converted microbiologically to V'.

After one of the enzymatically modifiable groups Z or V is converted into the corresponding primary product Z' or V', the resulting primary product can thereafter be cyclized by conventional methods and processes, such as described in J. Chem. Soc. [London], 5072 (1963) by G. H. Douglas et al.

In practice, Y can be cyclized with Z (or V), or also with Z' or V'.

As suitable substituents of Y, Z, or Z' which can undergo ring closure reactions there can be employed,, for example, the keto, carboxyl, aldehyde, hydroxyl, and amino groups, and activated —CH$_2$— or =CH— groups or a C=C double bond. The ring closure can be carried out by any of the conventional reaction routes, although the preferred reaction scheme is by dehydration with ring closure. In cases when Y, Z, or Z' contains several of the above labile substituents which can participate in the ring closure reactions, for example two free hydroxyl groups, then it is desirable to mask one of these groups, for example, by esterification before cyclization.

The process of the present invention is particularly valuable in the treatment of optically inactive compounds having as the modifiable substituent a keto group. In the selective enzymatic reduction of these compounds, the fermentation systems preferably comprise a fungus, such as, *Aspergillus ochraceus, Aspergillus niger, Penicillium notatum;* a yeast, such as *Saccharomyces uvarum, Saccharomyces cerevisiae, Saccharomyces carlsbergensis, Saccharomyces pastorianus;* or a bacterium, such as *Bacillus esterificans, Bacillus laterosporus, Brevibacterium vitarumen, Propionobacterium arabinosum, Protaminobacter alboflavus, Mesentericus* spec., *Mycoplana dimorpha,* or

*Bacillus thuringiensis.* Also suitable for use in reducing the keto group are the enzymes isolated from these microorganisms.

A review about possibly used microorganisms for the different reaction types is given in Type Reaction in Fermentation Chemistry by Lowell L. Wollen et al. (Agriculture Research Service, U.S. Department of Agriculture, May 1959).

The choice of a suitable microorganism and fermentation conditions to be used in the conversion of Z to Z′ firstly depends on the form of the ultimately desired product, i.e., D- or L-form, and secondly on the type of the modifiable substituent Z of the starting product, or of its variant V. A preliminary test can be conducted, however, in a routine manner to ascertain the most suitable microorganism and fermentation conditions.

The stereospecific process of the invention is particularly valuable in the total synthesis of steroids, for the production of active steroid substances, and also in the production of their intermediates which can then be further converted, in the conventional manner, to the various steroid hormones. In the manufacture of steroids, the racemate is most commonly produced by formation of an asymmetric C-atom 13 in sterically non-specific ring closure reactions, as shown, for example, by the following reaction scheme:

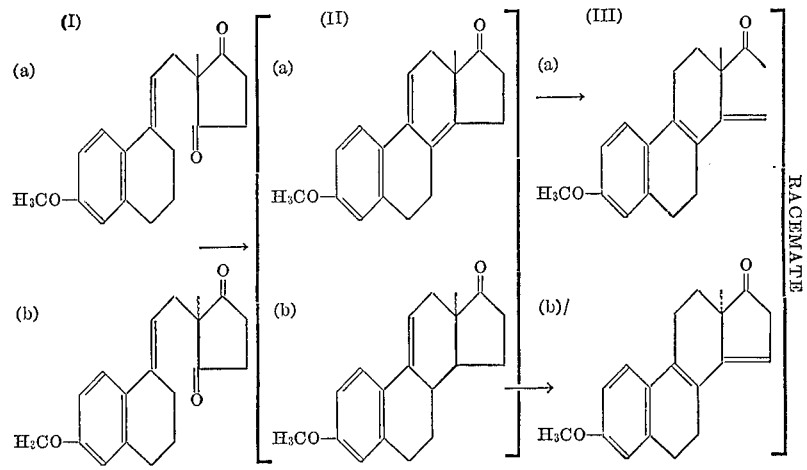

In these reactions, the starting material I in form (a) undergoes acid dehydration of the 14-keto group with the two H-atoms at C-atom 8, thus producing the desired 1,3,5(10),8(9),14 - estrapentaene - 3 - ol - 17 - one - 3 - methyl ether. By the rotation of the cyclopentane ring through 180° about the freely movable axis C–12–C–13, compound I can also react in form (b) and ring closure in this instance takes place by elimination of the 17-keto group with the two C–8–H-atoms. The non-specificity of these reactions is, however, attributable to the equivalence of the two keto groups.

In order to produce the desired enantiomeric form in sensible yields, and avoid the formation of the racemate, it is necessary to utilize the so-called partial synthesis, i.e., to begin the synthesis with a naturally occurring compound having the ultimately desired configuration.

When using the products of the present process in the total synthesis of optically active steroids, it is preferred to employ as the starting materials those having the D-ring or D-homo ring of the ultimately desired steroid compound. By utilizing such starting materials, there can be produced optically active antipodes of the following Formula XI:

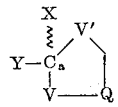 (XI)

wherein:

$C_a$ represents an optically active carbon atom of an optically active antipode;

Y represents an organic residue;

X represents hydrogen, halogen, a free or esterified carboxyl group, or a saturated or unsaturated alkyl residue of 1–4 carbon atoms which can be additionally substituted by halogens or by a hydroxyl, amino, or carboxyl group in the free or functionally converted form;

V represents a keto group in the free form or in the form of an oxime, hydrazone, or semicarbazone;

V′ represents $>CH \cdot OH$ or $>CH \cdot NH_2$ wherein the hydroxyl and amino groups can also be functionally converted or represents a keto group, but not when V is a keto group, with the further provision that Y can also, jointly with V or V′, form a cyclic residue via a saturated or unsaturated carbon-carbon bond; and Q′ represents $-CH_2-CH_2-$ or $-CH_2-$.

In accordance with the present invention, the compounds of Formula XI can be produced by starting with a compound of Formula XII, as follows:

 (XII)

wherein:

$C_i$ represents an optically inactive carbon atom;

X, Y, and V have the above-indicated meaning, except that Y and V have not undergone ring closure; and Q has the value given above.

In this latter embodiment, V is selectively converted microbiologically to V′, $C_i$ simultaneously becomes the asymmetric C-atom $C_a$ of an optically active antipode. In cases where Y and V or V′ are capable of ring closure, they can, if desired, be cyclized after masking of the hydroxyl group, if desired, which is also capable of undergoing ring closure.

Especially valuable intermediates produced by the present invention are, for example, the 3-ethers of 13β-X-8(14)-seco-1,3,5(10),9(11) - estrapentaene - 3,17β-diol-14-one and 13β-X-1,3,5(10),8(9),14-estrapentaene-3,17β-diol, D- and L-13β-X-8(14) - seco - 1,3,5(10),9(11)-estratetraene-14,17-dionemonosemicarbazone, 1-methyl-1-(6-carboxy-3-ketohexyl)-cyclopentane-1-ole-3-one. These compounds are particularly valuable as starting materials in the production of estrone and estradiol derivatives which are important as basic steroid substances.

The stereospecific process of this invention can advantageously be used for the manufacture of optically active antipodes of Formula XI:

wherein $C_a$, Q, V and V' have the above-indicated meanings, and Y represents the groups:

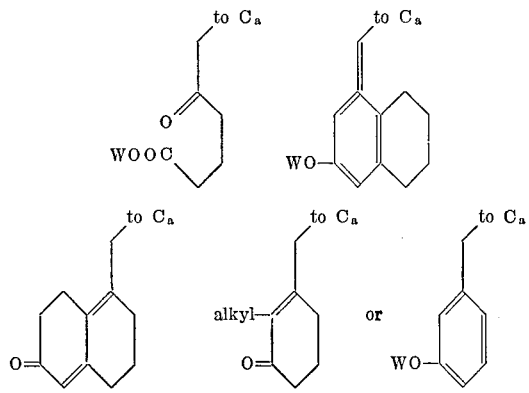

when Q is $CH_2$ or $-CH_2CH_2-$, and

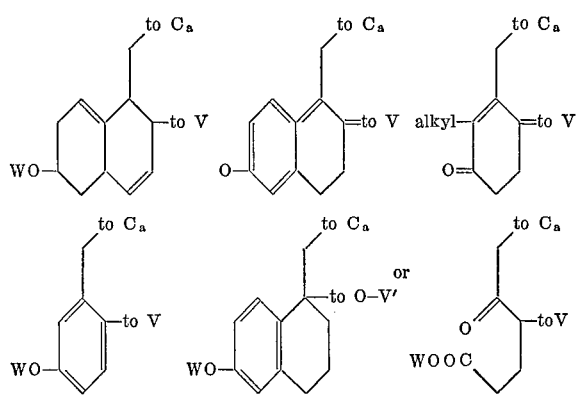

wherein:

W is hydrogen or an alkyl residue having 1 to 7 carbon atoms and wherein the residues quoted can also be substituted;
X represents hydrogen, $-CH_3$ or $-C_2H_5$;
V represents C=O; and
V' represents

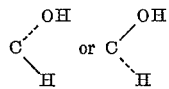

(in the free or esterified form).

According to the present process, the compounds of Formula XIII are produced by selectively and microbiologically reducing a keto group of an optically inactive compound of Formula XIV, as follows:

wherein:

$C_i$ represents an optically inactive carbon atom; and
X, Q and Y have the above indicated meanings.

After the selective reduction, the residual keto group can, if desired, be condensed, optionally after masking the formed hydroxyl group with Y, ring closure being effected.

The compounds obtained after the ring closure is effected can be easily converted by conventional methods to the corresponding estrone or estradiol derivatives. For example, the conversion can be effected by reducing double bonds present, oxidizing the 17-hydroxyl group, optionally after preliminary saponification of the 17-ester group, and, if a modification in configuration in the 17-position is to be achieved, again to reduce this group to the OH— group. In the same manner, the WO— group substituted in the 3-position can, depending upon the significance of W, be converted to the ultimately desired form; a free hydroxyl group can be produced by decomposition of an ether or by saponification, whereas, on the other hand, the free hydroxyl group can be functionally converted in the conventional manner by etherification or esterification.

Depending upon the fermentation system employed, the substituent X and also, for example, the hydroxyl group in the 17-position are obtained in the α- or β-configuration. The compounds having these substituents present in the β-configuration are particularly valuable in the preparation of steroid hormones. Yeasts of the class Saccharomyces, preferably *Saccharmoyces uvarum* (CBS 1508), or the enzymes which can be isolated therefrom, are especially suited for the production of these compounds. Exemplary of the chemical conversion of an 8(14)-seco-compound are the following reaction schemes:

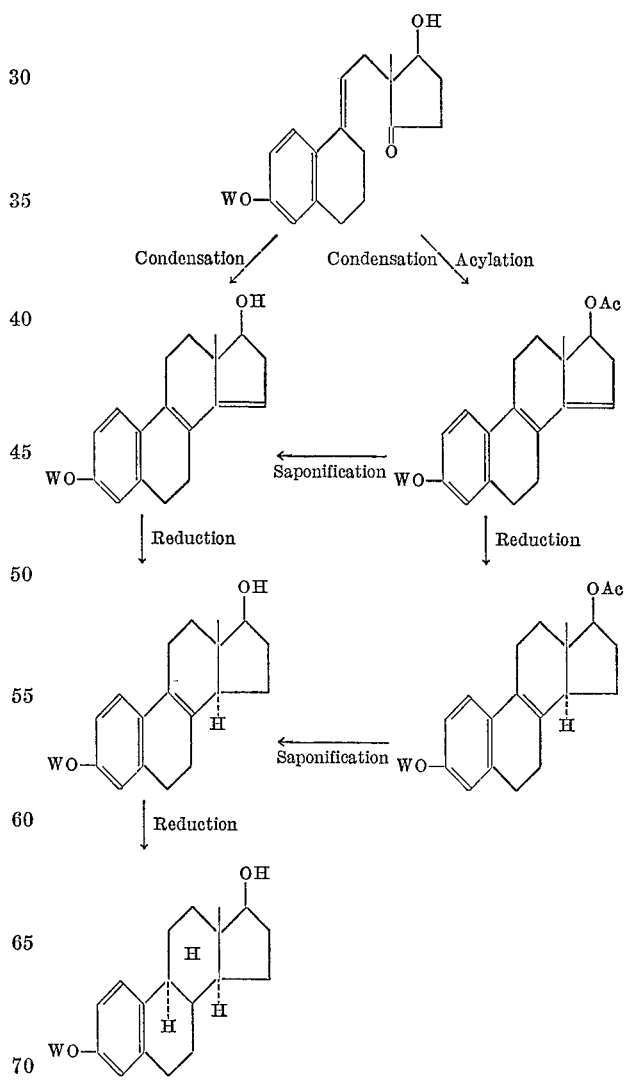

Although the process of this invention is particularly valuable in the manufacture of active steroid substances or the intermediates used in their production, it can also advantageously be used in the production of many other components, as illustrated by the formula scheme, as follows:

(1) α-Aminoacid Synthesis

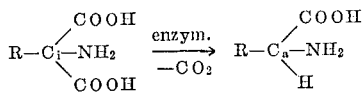

(2) Atropine Synthesis (a)

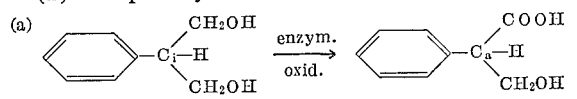

(b)

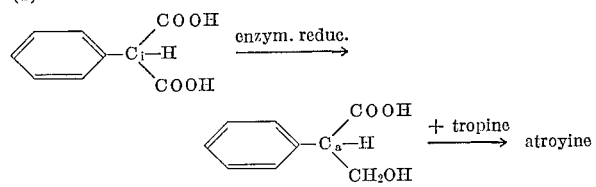

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the following examples, CBS and NCYC and BBA mean central bureau for Schimmel cultures Baarn/Netherlands; national collection of yeast cultures, United Kingdom; and Biologische Bundesanstalt, Germany, respectively; SM means 3 - methoxy-8(14)-seco-1,3,5(10),9(11)-estratetraene-14,17-dione; 13β-methyl-14α-OH-SM$_1$ (13α-methyl-17β-OB-SM$_1$) means 3-methoxy - 14α - hydroxy-8(14)-seco - 1,3,5(10),9(11) - estratetraene-17-one; and 13β-methyl-17α-OH-SM$_1$ (13α-methyl - 14β - OH - SM$_1$) means 3-methoxy-17α-hydroxy - 8(14) - seco-1,3,5(10),9(11)-estratetraene-14-one.

EXAMPLE 1

Preparation of 3 - methoxy-8(14)-seco-1,3,5(10),9(11)-estratetraene-14α-ol-17-one (13β-methyl-14α-OH-SM$_1$, equivalent to 13α-methyl - 17β - OH - SM$_1$) by fungal fermentation (a) Reduction of 3-methoxy-8(14) - seco - 1,3,5(10), 9(11)-estratetraene-14,17-dione (SM) with *Aspergillus ochraceus* (CBS).—(Fermentation with fungal strains in a shaken flask) A 2 l. Erlenmeyer flask was charged with 500 cc. of a nutrient solution containing:

| | Percent |
|---|---|
| Glucose | 3 |
| Corn steep liquor | 1 |
| NaNO$_3$ | 0.2 |
| K$_2$HPO$_4$ | 0.2 |
| KH$_2$PO$_4$ | 0.1 |
| MgSO$_4$ | 0.05 |
| KCl | 0.05 |
| FeSO$_4$ | 0.002 | and sterilized by heating for half an hour to 120° C., whereupon the mixture was cooled and inoculated with a suspension of *Aspergillus ochraceus* which is obtained by rinsing an inclined agar culture with physiological saline solution.

The preliminary culture is shaken for days at 30° C. at a frequency of 145 r.p.m., and 50 cc. aliquot portions of the culture are then transinoculated into each of ten 2 l. fermentation flasks, each containing 450 cc. of the above-described nutrient solution. These flasks are then shaken for 16 hours at 30° C., 5 cc. of a 2% ehanolic SM solution are added to each flask under sterile conditions, and the mixture fermented for an additional 24 hours.

The fermentation is analytically monitored by means of thin film chromatography. For this purpose, the methyl isobutyl ketone extracts of the fermentation samples are applied to silica gel plates according to the method of Stahl, the plates developed using the system chloroform/acetone, in a volume ratio of 9:1, over a 15 cm. running surface. The treated surface is then sprayed with a reagent consisting of 1 cc. of concentrated H$_2$SO$_4$ and 20 cc. of 95% ethanol, dried for 10 minutes at 140° C., and analyzed by long wave length ultraviolet light.

| | |
|---|---|
| SM | R$_F$0. 92 color, reddish yellow. |
| 13β-methyl-14α-OH-SM$_1$ and 17α-OH-SM$_1$ | R$_F$0. 72 color, reddish yellow. |
| 13βmethyl-14β-OH-SM$_1$ and 17β-OH-SM$_1$ | R$_F$0. 63 color greenish yellow. |

The combined fermentation charges are twice extracted with 2500 cc. portions of methyl isobutyl ketone, and the extract is concentrated to approximately 5 cc. under vacuum at 45° C. bath temperature. The concentrate is purified by preparative thin film chromatography using silica gel GF$_{254}$ (E. Merck AG, Darmstadt, Germany, as the absorbent and, as the running agent, benzene/ethyl acetate, in a volume ratio of 9:1.

The main zone of the chromatogram which is visible under short wave length ultraviolet light (having an R$_F$ value of approximately 0.4) is separated off, eluted with 100 cc. of methylene chloride at room temperature, the eluate concentrated at 25° C., and the residue recrystallized from 10 parts of diisopropyl ether. There is obtained 13β-methyl-14α-OH-SM$_1$, M.P. 101/102–103.5° C., α$_D^{20}$ +47.8° (dioxane, c.=1), ε$_{264}$=20900.

(b) Reduction of SM by means of *Aspergillus niger* (ATCC 9142).—13β-methyl-14α-OH-SM$_1$ is obtained under the same experimental conditions as described in Example 1(a) by fermentation of SM with *Aspergillus niger* (ATCC 9142).

(c) Reduction of SM with *Rhizopus nigricans* (ATCC 6227b).—13β-methyl-14α-OH-SM$_1$ is produced by fermentation with *Rhizopus nigricans* (ATCC 6227b) under the reaction conditions described in Example 1(a).

(d) Reduction of SM with *Penicillium notatum* (NRRL 2284).—13β-methyl-14α-OH-SM$_1$ can also be produced from SM by fermentation with *Penicillium notatum* (NRRL 1982) under the reaction conditions employed in Example 1(a).

EXAMPLE 2

Preparation of 13β-methyl-14α-OH-SM$_1$ by fermentation with yeasts (a) Reduction of SM with *Saccharomyces cerevisiae* (NRRL Y-2250).—(Fermentation with yeasts in shaken flasks) 500 cc. of a nutrient solution comprising 5% glucose and 2% corn steep liquor are charged into a 2 l. Erlenmeyer flask. The solution is sterilized and then inoculated with a suspension of *Saccharomyces cerevisiae* (NRRL Y-2250) obtained by flushing an inclined agar culture with physiological saline solution. The preliminary culture is agitated at 30° C. for one day at a frequency of 145 r.p.m. 50 cc. of aliquot portions of this culture are then transferred each into four 2 l. fermentation flasks, each of which contains 450 cc. of this same nutrient solution. These flasks are then shaken for 6 hours at 30° C., 5 cc. of a 2% ethanolic SM solution is added to each flask, and the mixture fermented for a further 20 hours. The fermentation suspensions are thereafter worked up as described in Example 1(a). There is obtained 13β-methyl-14α-OH-SM$_1$, M.P. 101/102–104° C., α$_D^{20}$+46.2° (dioxane, c.=1, ε$_{264}$=21000.

(b) Reduction of SM with *Sacharomyces cerevisiae* (NCYC 1021).—13β-methyl-14α-OH-SM$_1$ is produced from SM by fermentation with *Saccharomyces cerevisiae* (NCYC 1021) under the condition described in Example 2(a).

(c) Reduction of SM with *Saccharomyces carlsbergensis* (CBS 1505).—13β-methyl-14α-OH-SM$_1$ is produced from SM by fermentation with *Saccharomyces carlsbergensis*

(CBS 1505) under the conditions described in Example 2(a).

(d) Reduction of SM with *Saccharomyces pastorianus* ([Institut für Gärungsgewerbe] Western Berlin; Kop. 33).—13β-methyl-14α-OH-SM$_1$ is produced from SM by fermentation for 40 hours with *Saccharomyces pastorianus* by the method described in Example 2(a).

EXAMPLE 3

Preparation of 13β-methyl-14α-OH-SM$_1$ by fermentation with bacteria (a) Reduction of SM with *Bacillus esterificans* (BBA—Western Berlin).—(Fermentation by means of bacteria in a shaken flask). A 2 l. Erlenmeyer flask containing 500 cc. nutrient solution comprising 0.5% glucose, 0.2% corn steep liquor, 0.5% yeast extract, and 0.1% peptone (Merck) is sterilized and then inoculated with a suspension of *Bacillus esterificans* obtained by flushing an inclined agar culture with physiological saline solution. The preliminary culture is shaken at 30° C. for one day at a frequency of 145 r.p.m. 50 cc. aliquot portions of this culture are transferred into each of four 2 l. fermentation flasks, each containing 450 cc. of the same nutrient solution. These flasks are then shaken for 4 hours at 30° C., 5 cc. of a 2% ethanolic SM solution is added to each flask, and the mixture fermented for a further 20 hours.

The fermented suspension is worked up as described in Example 1(a), and there is obtained 13β-methyl-14α-OH-SM$_1$, M.P. 101/102–104° C.

(b) Reduction of SM with *Bacillus laterosporus* (ATCC 4517).—13β-methyl-14α-OH-SM$_1$ is prepared from SM by fermentation for 44 hours with *Bacillus laterosporus*, using the method described in Example 3(a).

(c) Reduction of SM with *Brevibacterium vitarumen* (ATCC 10234).—SM is reduced to 13β-methyl-14α-OH-SM$_1$ by fermentation with *Brevibacterium vitarumen* under the conditions described in Example 3(a).

(d) Reduction of SM with *Propionibacterium arabinosum* (ATCC 4965).—13β-methyl-14α-OH-SM$_1$ is prepared from SM by fermentation with *Propionibacterium arabinosum* under the conditions described in Example 3(a).

(e) Reduction of SM with *Protaminobacter alboflavus* (ATCC 8458).—13β-methyl-14α-OH-SM$_1$ is produced from SM by fermentation with *Protaminobacter alboflavus* under the conditions specified in Example 3(b).

(f) Reduction of SM with *Mesentericus* spec. (Robert Goch Inst., Western Berlin).—13β-methyl-14α-OH-SM$_1$ is obtained from SM by fermentation with *Mesentericus* spec. under the conditions specified in Example 3(a).

(g) Reduction of SM with *Mycoplana dimorpha* (ATCC 4279).—13β-methyl-14α-OH-SM$_1$ is produced from SM by fermentation with *Mycoplana dimorpha* under the conditions specified in Example 3(b).

(h) Reduction of SM with *Bacillus thuringiensis* (BBA—Darmstadt).—(Fermentation with bacteria in a fermenter) A 50 l. stainless steel fermenter is charged with 30 l. nutrient medium comprising:

| | Percent |
|---|---|
| Glucose | 0.5 |
| Yeast extract | 0.5 |
| Corn steep liquor | 0.2 |
| Peptone (Merck) | 0.1 | and is then sterilized by heating for half an hour at 120° C., and inoculated with 1 l. of a one day old agitated culture of *Bacillus thuringiensis*.

(The inoculum is obtained under the same conditions as described for the culturing flasks in Example 3(a).)

After fermenting for one day at 29° C. with stirring (220 r.p.m.) and aeration (1.65 m.³/h.), 1.8 l. of the culture are transferred, under sterile conditions, into a fermenter of equal size containing 28 l. of the same nutrient solution. After 6 hours' culturing with stirring and aeration as above, silicone oil SH+5% lard oil are added as an anti-foaming agent, a solution of 15.0 g. of SM in 800 cc. of ethanol is added, and the mixture fermented for an additional 16 hours. Thereafter, the fermenter suspension is twice extracted with 15 l. portions of methyl isobutyl ketone, the extract concentrated under vacuum at 45° C. to yield a viscous syrup, and the latter dissolved in 150 cc. of isopropyl ether. After 20 hours of standing at 0° C., the crystals which separate are filtered off, washed with a small amount of ice cold isopropyl ether, and dried at 60° C. under vacuum. Yield: 13.1 g. of 13β-methyl-14α-OH-$SM_1$ (87% of theory), M.P. 98/99–100° C.

This substance can be further purified by recrystallization from 4 parts of alcohol.

(i) Reduction of SM with *Protaminobacter alboflavus* (ATCC 8458).—Under the conditions described similarly in Example 3(h), SM is reduced with *Protaminobacter alboflavus* by terminating the aeration 20 hours after addition of the substrate, and continuation of the fermentation thereafter for an additional 20 hours. In order to isolate the 13β-methyl-14α-OH-$SM_1$ formed, it is necessary to dissolve the concentrate of the crude extract in methylene chloride, filter it over a silica gel column which has been previously deactivated with 10% water, and crystalline the eluate from diisopropyl ether, as described.

EXAMPLE 4

Preparation of 3-methoxy-8(14)-seco-1,3,5(10),9(11)-estratetraene-17β-ol-14-one (13β-methyl - 17β - OH-$SM_1$) by fermentation with yeasts (a) Reduction of SM with *Saccharomyces ellipsoides* (Tokayer strain S 22, Berlin).—SM is reduced by means of *Saccharomyces ellipsoides* (Tokayer strain) under the conditions described in Example 2. The crude product obtained by preparative thin film chromatography is twice recrystallized from approximately 10 parts of diisopropyl ether and yields 13β-methyl-17β-OH-$SM_1$. M.P. 110/112–114° C., $\alpha_D$—39.2° (dioxane, c.=1), $\epsilon_{264}$=20800.

(b) Reduction of SM with *Saccharomyces pastorianus* (Institut für Gärungsgewerbe, Western Berlin, Kop 127).—13β-methyl-17β-OH-$SM_1$ is produced from SM by fermentation with *Saccharomyces pastorianus* under the conditions described in Example 2(a).

(c) Reduction of SM with *Saccharomyces carlsbergensis* (CBS 2354).—13β-methyl-17β-OH-$SM_1$ is produced from SM by fermentation with *Saccharomyces carlsbergensis* (CBS 2354) under the experimental conditions described in Example 2(a).

(d) Reduction of SM with *Saccharomyces uvarum* (CBS 1508).—(Fermentation with yeast in a fermenter) A 50 l. stainless steel fermenter is charged with 30 l. of a nutrient solution comprising 5% glucose and 2% corn steep liquor, and sterilized by heating for half an hour at 120° C. The solution is then inoculated with 1 l. of an agitated, one day old culture of *Saccharomyces uvarum* (CBS 1508).

(The inoculum is produced under the same conditions as those described for the culturing flasks in Example 2(a).)

After fermentation for one day at 29° C. with stirring (220 r.p.m.), and aeration (1.65 m.³/h.), 1.8 l. of the culture are transferred under sterile conditions into another 50 l. fermenter containing 28 l. of the above nutrient solution. After 6 hours of culturing with stirring and aeration as above, silicone oil SH+5% lard oil are added as anti-foaming agent, a solution of 45.0 g. of SM in 800 cc. of ethanol is added, and the mixture fermented for an additional 19 hours.

Thereafter, the fermenter suspension is twice extracted with 15 l. portions of methyl isobutyl ketone, the extract concentrated under vacuum at 45° C. to a syrup, the syrup treated with 400 cc. of diisopropyl ether, and the resulting solution allowed to stand for 16 hours at 0° C.

The resulting crystals are filtered off, washed with 25 cc. of ice cold diisopropyl ether and dried under vacuum at 60° C. Yield: 31.8 g. 13β-methyl-17β-OH-SM$_1$ (71% of theory), M.P. 106/108–109° C., $\alpha_D^{20}$ —34.5° (dioxane, c.=1), $\epsilon_{264}$=20100.

This compound can be further purified by recrystallization from four parts of ethanol.

EXAMPLE 5

Preparation of 13β-methyl-17β-OH-SM$_1$ by reduction of SM with *Curvularia lunata* (NRRL 2434)

(Fermentation by fungi in a fermenter) A 50 l. stainless steel fermenter is charged with 30 l. of a nutrient solution comprising:

| | Percent |
|---|---|
| Glucose | 3 |
| Corn steep liquor | 1 |
| NaNO$_3$ | 0.2 |
| K$_2$HPO$_4$ | 0.2 |
| KH$_2$PO$_4$ | 0.1 |
| MgSO$_4$ | 0.05 |
| KCl | 0.05 |
| FeSO$_4$ | 0.002 |

The solution is sterilized by heating for half an hour at 120° C., and inoculated with 1 l. of an agitated two day old culture of *Curvularia lunata* (NRRL 2434).

(The inoculum is prepared under the same conditions as described for the culturing flasks in Example 1(a).)

After fermenttaion for two days at 29° C. with stirring (220 r.p.m.) and aeration (1.65 m.³/h.), 3 l. of the culture are transferred under sterile conditions into a second 50.1 fermenter, together with 27.1 of the above nutrient solution.

After 16 hours of culturing with stirring and aeration as above, Pluronic L 81, acting as an anti-foaming agent, and a solution of 6.0 g. of SM in 450 cc. of ethanol are added, and the mixture fermented for a further 20 hours. Thereafter, the fermenter suspension is twice extracted with 15 l. portions of methyl isobutyl ketone, the extract concentrated to a syrup under vacuum at 45° C., and the latter fractionated by column chromatography on 200 g. of silica gel, deactivated with 10% water as the absorbent, and carbon tetrachloride/methylene chloride mixture as the eluent.

The fractions containing 13β-methyl-17β-OH-SM$_1$ are combined and recrystallized from isopropanol ether after concentration.

EXAMPLE 6

Preparation of 3 - methoxy-8(14)-seco-1,3,5(10),9(11)-estratetraene-17α-ol-14-one (13β-methyl-17α-OH-SM$_1$) by reduction of SM with *Arthrobacter simplex* (ATCC 6946)

SM is fermented with the Arthrobacter simplex under the conditions described in Example 3(i).

Crystals having the following properties are obtained: M.P. 91/92–95° C., $\alpha_D$—16° (dioxane, c.=1).

These crystals are purified by repeated fractional crystallization from diisopropyl ether and from ethanol.

13β-methyl-17α-OH-SM$_1$ is obtained, M.P. 100/101–102° C., $\alpha_D^{20}$—44.3° (dioxane, c.=1), $\epsilon_{264}$=20600.

EXAMPLE 7

3-methoxy-1,3,5(10),8,14-estratetraene-17β-ol C$_{19}$H$_{22}$O$_2$ (282.37)

30.04 g. (0.100 ml.) of 13β-methyl-17β-OH-SM$_1$ in 42 ml. of methanol and 84 ml. of methylene chloride are boiled for 2½ hours with 0.81 ml. of concentrated hydrochloric acid, under reflux. The solution is then poured into 85 ml. of water, the organic phase separated off, and the aqueous phase twice extracted with methylene chloride. The combined organic phases are washed with bicarbonate solution and water until neutral, and are dried. After stripping off the solvent under vacuum and recrystallization from ethanol, there is obtained 21.00 g. (74.4%) of 3-methoxy-1,3,5(10),8,14-estrapentaene-17β- of M.P. 107–109° C., $\alpha_D^{20}$—141° (c.=1, CHCl$_3$). This substance is identical with the 3-methoxy-1,3,5(10),8,14-estrapentaene-17β-ol obtained by racemate resolution from racemic material, as analytically determined by using melting point, optical rotation, and all spectra, as well as gas chromatography and thin film chromatography techniques.

EXAMPLE 8

3-methoxy-1,3,5(10),8-estratetraene-17β-ol C$_{19}$H$_{24}$O$_2$ (284.38)

58.00 g. (0.205 mol) of 3-methoxy-1,3,5(10),8,14-estrapentaene-17β-ol are hydrogenated, using as a catalytic reaction medium 8.2 g. of pre-hydrogenated 5% palladium/calcium carbonate in a solution of 200 ml. of benzene and 200 ml. of tetrahydrofuran. 4820 ml. of hydrogen (95% of theory) are reacted over a period of 50 minutes. The catalyst is filtered off from the solution. After evaparation of the solvent under vacuum, and recrystallization from ethanol, 39.80 g. (68.2%) of 3-methoxy-1,3,5(10),8-estratetraene-17β-ol are obtained, M.P. 123–126° C., $\alpha_D^{20}$—7.1° (c.=1, CHCl$_3$).

EXAMPLE 9

3-methoxy-1,3,5(10)-estratriene-17β-ol ("estradiol methyl ether"), C$_{19}$H$_{26}$O$_2$ (286.39)

11.35 g. (0.040 mol) of 3-methoxy-1,3,5(10),8- estratetraene-17β-ol are dissolved in 120 ml. of absolute tetrahydrofuran and added at =50° C. to a solution of 100 mg. of lithium in 120 ml. of liquid ammonia and 9.9 ml. of aniline. 340 mg. of lithium are added a little at a time at the same temperature, and the resultant mixture stirred for a further 10 minutes. Thereafter, 0.72 ml. of water in 12 ml. of tetrahydrofuran are added, whereupon the solution turns clear. After adding a further 0.59 g. of lithium, the mixture is stirred for another 20 minutes, and the solution is then decolorized by means of ammonium chloride. After removing the ammonia, water is added, the organic solvents are largely stripped off under vacuum, and the residual mixture is extracted with methylene chloride. The combined methylene chloride solutions are washed in 1 N hydrochloric acid until free from aniline, and washed with bicarbonate solution and water until neutral. After drying the solution, stripping off the solvent under vacuum and recrystallizing from ethanol, there are obtained 8.5 g. (74.0%) of 3-methoxy-1,3,5(10)-estratriene-17β-ol ("estradiol methyl ether"), M.P. 114–116° C., $\alpha_D^{20}$+72°.

According to melting point, optical rotation and all spectra, as well as gas chromatography and thin film chromatography, this substance is identical with estradiol methyl ether obtained from natural material.

EXAMPLE 10

3-methoxy-1,3,5(10),8,14-estrapentaene-17β-ol-acetate, C$_{21}$H$_{24}$O$_3$ (324.40)

5.00 g. (0.0167 mol) of 13β-methyl-17β-OH-SM$_1$ are treated for 15 hours in pyridine, at room temperature, with 30 ml. of acetic anhydride. The mixture is then poured into hydrochloric acid, extracted with methylene chloride solution, and the combined methylene chloride phases are washed with 1 N hydrochloric acid, bicarbonate solution, and water until neutral. The oil remaining after drying and stripping the solvent under vacuum is taken up in 800 ml. of benzene and boiled for 15 minutes with 2.8 g. p-toluenesulfonic acid under a water separator. After cooling, the mixture is washed with bicarbonate solution and with water until neutral. Upon drying and stripping of the solvent, there are obtained 4.89 g. (90.5%) of 3-methoxy-1,3,5(10),8,14-estrapentaene-17β-ol-acetate, M.P. 79–82° C., $\alpha_D^{20}$—180°.

According to the gas chromatogram, this substance is 98% pure and can be hydrogenated to form 3-methoxy-1,3,5(10),8-estratetraene-17β-ol-acetate.

In order to compare the obtained product with the acetate of 3-methoxy-1,3,5(10),8,14-estrapentaene-17β-ol obtained by the racemate resolution of racemic material, the product is recrystallized from ethanol. There is obtained 3.60 g. (66.6%) of 3-methoxy-1,3,5(10), 8,14-estrapentaene-17β-ol-acetate. M.P. 86–87° C., $\alpha_D^{20}$ —188°.

These data, as well as the spectra and chromatograms, are identical with those of the acetate obtained by resolution of the racemate.

EXAMPLE 11

3-methoxy-1,3,5(10),8-estratetraene-17β-ol-acetate
$C_{21}H_{26}O_3$ (326.41)

2.40 g. (0.0074 mol) of 3-methoxy-1,3,5(10),8,14-estrapentaene-17β-ol-acetate in the crude state are hydrogenated in a catalytic medium of 664 mg. of prehydrogenated 5% palladium/calcium carbonate in 8 ml. of benzene and 8 ml. of tetrahydrofuran. 180 ml. of hydrogen (97% of theory) are reacted over a period of 2 hours. After filtering off the catalyst, stripping off the solvent under vacuum, and recrystallization from ethanol, 1.61 g. (66.6%) of 3-methoxy-1,3,5(10),8-estratetraene-17β-ol-acetate are obtained. M.P. 110–113° C., $\alpha_D^{20}$ —49° (c.=1, $CHCl_3$).

EXAMPLE 12

3-methoxy-1,3,5(10),8-estratetraene-17β-ol
$C_{19}H_{24}O_2$ (284.38)

2.70 g. (0.0083 mol) of 3-methoxy-1,3,5(10),8-estratetraene-17β-ol-acetate are stirred at room temperature for 3 hours with 50 ml. of 1 N methanolic caustic potash to dissolve the acetate. On cooling the solution, the product precipitates. The precipitation is completed by the addition of 100 ml. of ice water. 2.14 g. (95.1%) of 3-methoxy-1,3,5(10),8-estratetraene-17β-ol are obtained, M.P. 125–127° C., $\alpha_D^{20}$ —7.9° (c.=1, $CHCl_3$).

This substance is identical with that obtained by hydrogenating 3-methoxy - 1,3,5(10),8,14 - estrapentaene-17β-ol.

EXAMPLE 13

3-methoxy-1,3,5(10),8,14-estrapentaene-17β-ol
$C_{19}H_{22}O_2$ (282.37)

150 mg. (0.00046 mol) of 3-methoxy - 1,3,5(10),8,14-estrapentaene-17β-ol-acetate are stirred for 3 hours under a nitrogen atmosphere in 3 ml. of methanolic 1 N caustic potash to gradually dissolve the acetate. The mixture is acidified with 0.6 ml. of concentrated hydrochloric acid, then cooled in an ice bath, and precipitated with 2.4 ml. of water. After renewed recrystallization from ethanol/water, there are obtained 107.5 mg. (82.5%) of 3-methoxy - 1,3,5(10),8,14-estrapentaene-17β-ol. M.P. 101–102° C., $\alpha_D^{20}$ —135° (c.=1, $CHCl_3$).

EXAMPLE 14

3-methoxy-13α-1,3,5(10),8,14-estrapentaene-17β-ol-acetate, $C_{21}H_{24}O_3$ (324.40)

2.00 g. (0.067 mol) of 13β-methyl-14α-OH-$SM_1$ (identical to 13α-methyl-17β-OH-$SM_1$) in 20 ml. of pyridine are treated for 16 hours at room temperature with 12 ml. of acetic anhydride. Thereafter, the mixture is poured into water, extracted with methylene chloride, and the combined methyl chloride phases washed with hydrochloric acid, bicarbonate, and water until neutral. After drying and stripping off the solvent under vacuum, the oily noncrystallizable residue is taken up in 50 ml. of benzene and boiled with 120 mg. of p-toluenesulfonic acid under a water separator. After dilution with ether, the mixture is washed with water and bicarbonate until neutral, the solution is dried, and the solvent stripped off under vacuum. Recrystallization from ethanol yields 1.83 (84.7%) of 3-methoxy-13α-1,3,5(10),8,14-estrapentaene-17β-ol-acetate, M.P. 127–129° C., $\alpha_D^{20}$+183° (c.=1, $CHCl_3$).

EXAMPLE 15

3-methoxy-13α-1,3,5(10),8,14-estrapentaene-17β-ol
$C_{19}H_{22}O_2$ (282.37)

800 mg. (0.00246 mol) of 3-methoxy-13α-1,3,5(10), 8,14-estrapentaene-17β-ol-acetate in 16 ml. of 1 N methanolic caustic potash are stirred for 3 hours under a nitrogen atmosphere to dissolve the acetate. The product is precipitated with water, with ice cooling, and thoroughly washed. 681 mg. (97.6%) of 3-methoxy-13α-1,3,5(10), 8,14-estrapentaene-17β-ol are obtained. This substance decomposes above 32° C. $\alpha_D^{20}$+199 (c.=1, $CHCl_3$).

According to all spectra and chromatograms, the product consists of one component only but decomposes very easily.

EXAMPLE 16

3-methoxy-1,3,5(10),8,14-estrapentaene-17α-ol-acetate,
$C_{21}H_{24}O_3$ (324.40)

300 mg. (0.001 mol) of 13β-methyl-17α-OH-$SM_1$ are treated for 16 hours at room temperature with 3 ml. of pyridine and 2 ml. of acetic anhydride. The mixture is then poured into water, extracted with methylene chloride, and the combined methylene chloride solutions washed with hydrochloric acid, bicarbonate, and water until neutral. After drying and stripping off the solvent, an oil remains which is taken up in 8 ml. of benzene and boiled for 10 minutes with 18 mg. of p-toluenesulfonic acid. After dilution with ether, the mixture is washed with water and bicarbonate until neutral, the solution is dried, and the solvent stripped off. Recrystallization from ethanol yields 244 mg. (70.5%) of 3-methoxy-1,3,5(10),8,14-estrapentaene - 17α - ol - acetate, M.P. 126–127.5° C., $\alpha_D^{20}$—197° (c.=1, $CHCl_3$).

EXAMPLE 17

3-methoxy-1,3,5(10),8,14-estrapentaene-17α-ol
$C_{19}H_{22}O_2$ (282.37)

200 mg. (0.000618 mol) of 3-methoxy-1,3,5(10),8,14-estrapentaene-17α-ol-acetate are stirred in 4 ml. of 1 N methanolic caustic potash for 3 hours under a nitrogen atmosphere to completely dissolve the acetate. The mixture is precipitated with ice cooling, and the precipitate is filtered off and thoroughly washed. 128 mg. (73.5%) of 3-methoxy-1,3,5(10),8,14-estrapentaene - 17α - ol are obtained, which decomposes above 30° C. $\alpha_D^{20}$—197° (c.=1, $CHCl_3$). The substance has to be stored under cool conditions since it decomposes rapidly.

EXAMPLE 18

3-methoxy-8,14-seco-9ξ,14α-oxido-1,3,5(10)estratriene-17-one, $C_{19}H_{24}O_3$ (300.38)

400 mg. (0.00133 mol) of 13α-methyl-17β-OH-$SM_1$ are boiled in 20 ml. of methanol and 40 ml. of methylene chloride together with 0.4 ml. of concentrated hydrochloric acid, for half an hour under reflux. After adding water, the organic layer is separated off and the aqueous phase is extracted with methylene chloride. The combined organic phases are washed with bicarbonate and water until neutral, dried, and solvent is stripped off under vacuum. 400 mg. (100%) of 3-methoxy-8,14-seco-9,14α-oxido-1,3,5(10)estradiene - 17 - one are obtained, which compound, according to a thin film chromatogram, consists of a single substance. Repeated recrystallizations from ethanol yield 45 mg. of the material. N.P. 89–90° C., $\alpha_D^{20}$+41.7° (c.=1, $CHCl_3$).

The structure is demonstrated by infrared, ultraviolet, NMR, and mass spectra.

EXAMPLE 19

Preparation of 13β-methyl-14α-OH-SM₁ by fermentation with *Saccharomyces uvarum* (CBS 1508) by the resting cell method A 30 l. pre-fermentation culture of the *Saccharomyces uvarum* produced as described in Example 4(d) is centrifuged. The resulting yeast is washed with distilled water, again centrifuged, and suspended in 30 l. of distilled water. 500 cc. at a time of this suspension are charged into each of eight 2 l. Erlenmeyer flasks, and these are closed with a plug of cotton wool and shaken at 30° C. at a frequency of 145 r.p.m. After 4 hours, 250 mg. of SM, dissolved in 2.5 cc. of methyl Cellosolve, are added to each flask and the mixture fermented for a further 20 hours. Then, the fermentation charges are combined, extracted twice with 1 l. of methyl isobutyl ketone at a time, the extract evaporated to dryness under vacuum at 45° C. bath temperature, and the residue crystallized once from a benzene/hexane mixture and once from ethanol.

There is obtained 13β-methyl-14α-OH-SM₁, M.P. 101/102–103° C., $(\alpha)_D + 45.4°$ (dioxane, c.=1).

EXAMPLE 20

Preparation of 13β-methyl-14α-OH-SM₁ by fermentation with *Saccharomyces uvarum* (CBS 1508)—dry powder The yeast is obtained from a 30 l. pre-fermentation culture of CBS 1508 as described in Example 19. This yeast is suspended in 3 l. of acetone, the suspension is stirred for 15 minutes, the yeast filtered off and re-suspended in 3 l. of acetone, the mixture stirred, and the yeast filtered off and dried for 3 hours under vacuum at room temperature.

The dry powder obtained is suspended in 30 l. of distilled water and this suspension is used for the fermentation.

The fermentation of the SM and the working-up of the charges takes place as described in Example 19.

13β-methyl-14α-OH-SM₁ is obtained, M.P. 100/102–103° C., $(\alpha)_D + 43°$ dioxane (c.=1).

EXAMPLE 21

Preparation of 13β-methyl-14α-OH-SM₁ by means of a solution of 20α-hydroxy-steroid dehydrogenase 1 mg. of SM in 0.05 ml. of ethanol are added to a mixture of 4.4 ml. of 0.022 molar phosphate buffer (pH 5.5), 0.7 ml. of a 0.4% DPNH solution, and 0.03 ml. of a suspension, diluted 1:5, of 20β-hydroxy-steroid dehydrogenase (supplier: C. F. Boehringer & Sons G.m.b.H., Mannheim), and the mixture shaken for 15 minutes at room temperature. Thin film chromatographic analysis, as in Example 1(a), showed 13β-methyl-14α-OH-SM₁ as the only reaction product.

EXAMPLE 22

Preparation of 13β - ethyl-3-methoxy-8(14)-seco-18-nor-1,3,5(10),9(11)-estratetraene - 17β - ol-14-one (13β-ethyl-17β-OH-SM₁)

15.0 g. of 13β-ethyl-3-methoxy-8(14) - seco - 18-nor-1,3,5(10),9(11)-estratetraene-14,17-dione (13βethyl-SM) are fermented with *Saccharomyces uvarum* (CBS 1508) for 20 hours under the conditions described in Example 4(d). The fermenter suspension is then twice extracted with 15 l. portions of methyl isobutyl ketone, the extracts concentrated to a syrup at 45° C. bath temperature, and this reuslting product recrystallized from isopropyl ether.

There is obtained 13β-ethyl-3-methoxy-8(14)-seco-18-nor-1,3,5(10),9(11)-estratetraene - 17β - ol-14-one, M.P. 85–86.5° C., $(\alpha)_D + 15.2°$ (dioxane, c.=1).

According to the NMR spectrum, the hydroxyl group is in the β-position relative to the 13β-ethyl group.

EXAMPLE 23

Preparation of 3-methoxy-8(14)-seco-D-homo-1,3,5(10), 9(11)-estratetraene - 17αβ-ol-14 - one (17αβ-OH - (D-homo-SM₁))

1.6 g. of 3-methoxy-8(14) - seco - D - homo - 1,3,5 (10),9(11) - estratetraene-14,17α - dione (D-homo-SM) are fermented with an acetone dry powder of *Saccharomyces uvarum* (CBS 1508), as described in Example 20. The crude product obtained is purified by preparative thin film chromatography as described in Example 1(a), and recrystallized from isopropyl ether. There is obtained 3-mehtoxy - 8(14) - seco-D - homo-1,3,5(10), 9(11)-estratetraene - 17αβ-ol - 14-one. M.P. 115–116.5° C., $(\alpha)_D + 28.5°$ (dioxane, c.=1).

EXAMPLE 24

Preparation of 2-methyl-3-methoxy-8(14)-seco-1,3,5, (10),9(11)-estratetraene-14α-ol-17-one 500 cc. of a suspension of *Saccharomyces uvarum* (CBS 1580)—dry powder (Example 20) are charged into each of sixteen 2 l. Erlenmeyer flasks; these are closed with a plug of cotton wool and shaken at 30° C. at a frequency of 145 r.p.m.

After one hour, 100 mg. of 2-methyl-3-methoxy-8(14)-seco-1,3,5(10),9(11) - estratetraene - 14,17 - dione [1] are added to each flask, and the mixture shaken for a further 48 hours. The fermentation charges are then combined twice extracted with 2 l. portions of methyl isobutyl ketone, the extract concentrated under vacuum at 45° C. bath temperature, the residue purified by preparative thin film chromatography (Example 1(a)), and the product crystallized from isopropyl ether. There is obtained 2-methyl - 3-methoxy - 8(14) - seco-1,3,5(10), 9(11) - estratetraene - 14α-ol - 17-one are obtained, M.P. 135–137° C., $(\alpha)_D^{20} + 47.8°$ (dioxane, c.=1).

According to the NMR spectrum, the hydroxyl group is in the α-position relative to 13β-methyl group.

EXAMPLE 25

Preparation of 4-methyl-3-methoxy-8(14)-seco-1,3,5, (10),9(11)-estratetraene-17β-ol-14-one 30 l. of a suspension of *Saccharomyces uvarum* (CBS 1508)—dry powder, as prepared in Example 20, are stirred at 200 r.p.m. in a stainless steel fermenter at 30° C., and aerated with 300 l. of air per hour. 3.0 g. of 4-methyl - 3-methoxy - 8(14) - seco - 1,3,5(10),9(11)-estratetraene-14,17-dione [2] dissolved in 800 cc. of ethanol are added and the mixture stirred for 48 hours with aeration and for a further 60 hours without aeration. The product is then extracted in the usual way with methyl isobutyl ketone, the extract concentrated, the residue fractionated by preparative thin film methods, and the crude product obtained is recrystallized from isopropyl ether.

There is obtained 4-methyl - 3-methoxy - 8(14) - seco-1,3,5(10),9(11) - estratetraene - 17β-ol - 14-one, M.P. 167–168° C., $(\alpha)_D - 43.6°$ (dioxane, c.=1).

According to the NMR spectrum, the hydroxyl group is in the β-position relative to the 13β-methyl group.

---

[1] This compound, which has not been described heretofore, is produced in a conventional manner, as follows: 6-methoxy-7-methyl Tetralin is oxidized with chromic acid to 6-methoxy-7-methyl tetralone-1 (M.P. 102–104° C.), wherefrom there is obtained after conducting a Grignard reaction with vinyl magnesium bromide and subsequent condensation of the thus-obtained "viscol" with 2—methylcyclopentanedione-1,3, the 2-methyl - 3 - methoxy-8(14)-seco-1,3,5(10),9(11)-estratetraene-14,17-dione (M.P. 101–103° C.).

[2] This starting product, which has heretofore not been disclosed, is produced in a conventional manner, as follows: 5-methyl-6-methoxy-tetralone-1 is subjected to a Grignard reaction by means of vinyl magnesium chloride, and the resulting corresponding "vinol" is condensed with 2—methyl-cyclopentanedione to 3 - methoxy-4-methyl-8(14)-seco-1,3,5(10), 9(11)-estratetraene-14,17-dione (M.P. 154–155° C.).

EXAMPLE 26

Preparation of d-β-(3,4-methylenedioxyphenyl)-glutaric acid monoethyl ester (a) β - (3,4 - methylenedioxyphenyl) - glutaric acid diethyl ester, $C_{16}H_{20}O_6$ (molecular weight 308.34).—10.0 g. of β-(3,4 - methylenedioxyphenyl)-glutaric acid (W. T. Smith Jun. and R. W. Shelton, J. Am., Chem. Soc. 76, 2731 [1954]) in 50 cc. of thionyl chloride are heated for 2 hours under reflux. The thionyl chloride is then distilled off under vacuum, the acid chloride obtained is treated with 100 cc. of absolute ethanol, and the mixture stirred until a clear solution is obtained which is allowed to stand for 16 hours at room temperature, and then is concentrated under vacuum on a steam bath. The resulting oil is taken up in ether, and the ether phase is washed with saturated aqueous bicarbonate solution followed by water, dried over $Na_2SO_4$, and fractionated in vacuum.

There are obtained 9.7 g. of β-methylenedioxyphenyl)-glutaric acid diethyl ester, equal to 79% of theory. B.P.$_{14}$: 222–224° C.

(b) Rac - β-(3,4 - methylenedioxyphenyl) - glutaric acid monoethyl ester, $C_{14}H_{16}O_6$ (molecular weight 280.27).—5.0 g. of β-(3,4-methylenedioxyphenyl) - glutaric acid diethyl ester are dissolved in 75 cc. of ethanol and the solution treated with 50 cc. of 10% aqueous caustic potash and kept at room temperature for 30 minutes. The solution is then treated with 100 cc. of water, acidified with 2 N hydrochloric acid, extracted with ether, and the ether phase washed with a little water, dried over $Na_2SO_4$ and concentrated to a syrup under vacuum at 50° C. bath temperature. The residue is fractionated on a silica gel column by means of chloroform/methanol gradients and yields 1.56 g. of rac-β-(3,4-methylenedioxyphenyl)-glutaric monoethyl ester, equal to 34% of theory, as a syrup.

Thin film chromatography:

When silica gel plates of the Stahl type are used, the following is observed:

The mixture is developed by means of the chloroform: methanol (4+1) system over a 15 cm. running surface, developed with a reagent consisting of 1 cc. of concentrated $H_2SO_4$ and 2 cc. of 95% ethanol, and dried for 30 minutes at 140° C.

The following compounds are obtained:

β-(3,4-methylenedioxyphenyl)-glutaric acid diethyl ester—$R_F$ 0.90
β-(3,4-methylenedioxyphenyl)-glutaric acid dimethyl ester—$R_F$ 0.90
β-(3,4-methylenedioxyphenyl)-glutaric acid monomethyl or monoethyl ester—$R_F$ 0.25
β-(3,4-methylenedioxyphenyl)-glutaric acid—$R_F$ 0.00.

(c) d - β - (3,4 - methylenedioxyphenyl) - glutaric acid monoethyl ester.—A 30 l. pre-fermentation culture of *Curvularia lunata* (NRRL 2434), produced under the conditions given in Example 5, is filtered through gauze, and the mycelium is washed twice with distilled water and suspended in 15 l. of distilled water.

500 ml. of the fungal suspension is charged into each of eight 2 l. Erlenmeyer flasks, which are then plugged with cotton wool and shaken at 30° C. at a frequency of 145 r.p.m. After one hour, 125 mg. of β-(3,4-methylenedioxyphenyl)-glutaric acid diethyl ester in 5 cc. of ethanol are added to each flask, and after a further 3 hours, 125 mg. of material in 1 ml. of ethanol are again added to each.

The fermentation is complete after 24 hours of shaking at 30° C. The culture suspensions are combined and twice extracted with 2 l. portions of methyl isobutyl ketone. The extract is then concentrated under vacuum at 45° C. bath temperature and the syrup resulting therefrom is worked up as described in Example 26(b).

There is obtained d - β - (3,4-methylenedioxyphenyl)-glutaric acid monoethyl ester, $(\alpha)_D + 9.6°$ (dioxane, c.=2). The identification of the substance is based on the infrared spectroscopic comparison with the corresponding racemate.

EXAMPLE 27

Preparation of d-β-(3,4-methylenedioxyphenyl)-glutaric acid monomethyl ester (6) β - (3,4 - methylenedioxyphenyl) - glutaric acid dimethyl ester, $C_{14}H_{16}O_6$ (molecular weight 280.27).—10.0 g. of β - (3,4 - methylenedioxyphenyl) glutaric acid (Example 26) are dissolved in 100 cc. of dry tetrahydrofuran, cooled to 0° C., and the solution stored for 30 minutes at 0° C. and 30 minutes at room temperature with 200 cc. of an ice cold diazomethane solution produced from 60 cc. of 40% aqueous caustic potash, 20.0 g. of nitrosomethyl urea, and 200 cc. of ether. The mixture is treated with 10 cc. of glacial acetic acid and then fractionated after decompositoin of the diazomethane. There are obtained 8.9 g. of β-(3,4-methylenedioxyphenyl)-glutaric acid dimethyl ester (80% of theory). B.P.$_{15}$: 215–219° C., M.P.: 40–42° C.

(b) Rac - β - (3,4 - methylenedioxyphenyl) - glutaric acid monomethyl ester, $C_{13}H_{14}O_6$ (molecular weight 266.25).—The synthesis of this substance is carried out analogously to that of rac - β - (3,4 - methylenedioxyphenyl)-glutaric acid monoethyl ester [Example 26(b)]. There are obtained 1.85 g. of rac-β-(3,4-methylenedioxyphenyl)-glutaric acid monomethyl ester (39% of theory) as a syrup.

analyogously to that of rac - β - (3,4 - methylenedioxy

Thin film chromatography: see Example 26(b).

(c) d - β - (3,4 - methylenedioxyphenyl) - glutaric acid monomethyl ester.—2.0 g. of the dimethyl ester are fermented with *Curvularia lunata* under the same conditions as those described in Example 26(c). There is obtained d - β - (3,4-methylenedioxyphenyl)-glutaric acid monomethyl ester, $(\alpha)_D + 7.2°$ (dioxane, c.=2).

The identification of this substance is based on the infrared spectroscopic comparison with the corresponding racemate.

EXAMPLE 28

Preparation of 1-β-(3,4-methylenedioxyphenyl)-glutaric acid monoethyl ester 1.6 g. of β-(3,4-methylenedioxyphenyl)-glutaric acid diethyl ester were fermented for 48 hours with *Penicillium albidum* (CMI 40,290) in 16 shaking flasks each containing 500 cc. of nutrient solution, under the conditions specified in Example 1(a). Working-up is conducted as described in Example 26(c).

There is obtained 1 - β - (3,4-methylenedioxyphenyl)-glutaric acid monoethyl ester. $(\alpha)_D - 8.9°$ (dioxane, c.=2).

This substance is identified by infrared spectroscopy by comparison with the corresponding racemate.

EXAMPLE 29

Preparation of d-3-(3,4-methylenedioxyphenyl)-pentan-5-ol-1-al (a) 3 - (3,4 - methylenedioxyphenyl) - pentane - 1,5-diol, $C_{12}H_{16}O_4$ (molecular weight 224.25).—A solution of 20 g. of β-(3,4-methylenedioxyphenyl)-glutaric acid diethyl ester (Example 26(a)) in 200 cc. of dry ether is added dropwise with stirring to a suspension of 4.0 g. of LiAlH$_4$ in 200 ml. of dry ether. Thereafter, the mixture is stirred for a further 16 hours, the excess LiAlH$_4$ is recomposed with ethyl acetate and water, the product filtered, and the ether phase washed with dilute hydrochloric acid, aqueous bicarbonate solution, and water, dried by means of Na$_2$SO$_4$ and concentrated to a syrup under vacuum.

The crude product is purified in a silica gel column by means of methylene chloride/ethyl acetate gradients, the resulting product being recrystallized from isopropyl ether.

7.8 g. of 3 - (3,4 - methylenedioxyphenyl) - pentane-1,5-diol (54% of theory) are obtained. M.P.: 69/70–71° C.

(b) d - 3 - (3,4 - methylenedioxyphenyl) - pentan - 5-ol-1-al.—1.6 g. of 3-(3,4-methylenedioxyphenyl)-pentane-1,5-diol dissolved in 80 cc. of methyl Cellosolve are fermented with *Achromobacter parvulus* (ATCC 4335) under the conditions described in Example 3(a) in 16 shaken flasks each containing 500 cc. of medium.

After 48 hours of fermentation, the fermentation suspensions are combined, twice extracted by shaking with 2 l. portions of methyl isobutyl ketone, the extract concentrated under vacuum at 45° C. bath temperature, and the residue fractionated in a silica gel column by means of methylene chloride/ethyl acetate gradients.

The product is crystallized from ethanol and contains d - 3 - (3,4 - methylenedioxyphenyl) - pentan - 5 - ol-1-al, M.P. 139/140–141° C., $(\alpha)_D^{20}+9.8°$ (ethanol, c.=2).

According to the NMR and infrared spectra, the compound is present in its pyranose form.

Thin film chromatography is carried out as described in Example 1(a), using chloroform:acetone (9+1) as the running agent.

There are obtained:

3-(3,4-methylenedioxyphenyl)-pentane-1,5-diol—$R_F$ 0.10
3-(3,4-methylenedioxyphenyl)-pentan-5-ol-1-al—$R_F$ 0.60.

EXAMPLE 30

Preparation of 1-3-(3,4-methylenedioxyphenyl)-pentan-5-ol-1-al 1.6 g. of 3 - (3,4 - methylenedioxyphenyl) - pentane-1,5-diol are fermented with *Acetobacter aerogenes* (BBA—Berlin) under the same conditions as described in Example 29(b). After being worked up, there is obtained 1 - 3 - (3,4 - methylenedioxyphenyl) - pentan-5-ol-1-al, M.P. 136/139–140° C., $(\alpha)_D$ —12.0° (ethanol, c.=2).

EXAMPLE 31

Preparation of d-2-(3,4-methylenedioxybenzyl)-propane-1,3-diol-1-acetate, $C_{11}H_{14}O_4$ (molecular weight 210.21)

(a) 2 - (3,4-methylenedioxybenzyl)-propane-1,3-diol.—20 g. of diethyl piperonyl malonate (Karrer, Helv. 6, 915 (1923) are reduced by means of LiAlH$_4$ under the conditions employed in Example 29(a).

9.2 g. of 2-(3,4-methylenedioxybenzyl)-propane-1,3-diol (64% of theory) are obtained. M.P. 83/84–86° C.

(b) d - 2-(3,4-methylenedioxybenzyl)-propane-1,3-diol-1-acetate.—1.6 g. of 2-(3,4-methylenedioxybenzyl)-propane-1,3-diol are fermented under the same conditions as described in Example 29(b), using *Myxococcus rubescens* (BBA—Berlin) but employing a fermentation time of 120 hours. The product is worked up and there is obtained d - 2 - (3,4 - methylenedioxybenzyl)-propane-1,3-diol-1-acetate as a syrup. $(\alpha)_D+8.5°$ (ethanol, c.=2).

The thin film chromatography was carried out in the same way as in Example 29(b). The following compounds are obtained:

2-(3,4-methylenedioxybenzyl)-propane-1,3-diol—$R_F$ 0.10
2 - (3,4 - methylenedioxybenzyl) - propane-1,3-diol-1-acetate—$R_F$ 0.60.

EXAMPLE 32

13β-ethyl-3-methyl-18-nor-1,3,5(10),8,14-estrapentaene-17β-ol, $C_{20}H_{24}O_2$ (286.40)

5.34 g. (0.017 mol) of 13β-ethyl-17β-OH-SM$_1$ in 7 ml. of methanol and 14 ml. of methylene chloride are heated under reflux for 3½ hours in the presence of 0.274 ml. of concentrated hydrochloric acid. The solution is then poured into 14 ml. of water and worked up analogously to Example 7. After recrystallization from ethanol, 4 g. (82%) of 13β-ethyl-3-methoxy-18-nor-1,3,5(10),8,14-estrapentaene-17β-ol are obtained, M.P. 88–90° C., $\alpha_D^{20}$ —140° (c.=1, CHCl$_3$),

EXAMPLE 33

13β-ethyl-3-methoxy-18-nor-1,3,5(10),8,14-estrapentaene-17β-ol-acetate, $C_{22}H_{26}O_3$ (338.43)

5.34 g. (0.017 mol) of 13β-ethyl-17β-OH-SM$_2$ are allowed to stand for 48 hours at room temperature with 4.30 ml. of acetic anhydride and 5.1 ml. of pyridine in 38 ml. of absolute benzene. The mixture is then poured into water and washed with hydrochloric acid and bicarbonate until neutral. The resulting benzene solution is dried, filtered, and thereafter heated for 30 minutes in the presence of 110 mg. of p-toluenesulfonic acid under a water separator. The solution is then washed until neutral, dried, filtered, and evaporated to dryness. After recrystallization from ethanol, 4.60 g. (80%) of 13β-ethyl - 3 - methoxy-18-nor-1,3,5(10),8,14-estrapentaene-17β-ol-acetate are obtained. M.P. 75–76° C., $\alpha_D^{20}$—202° (c.=1, CHCl$_3$).

EXAMPLE 34

3-methoxy-D-homo-1,3,5(10),8,14-estrapentaene-17β-ol-acetate, $C_{22}H_{26}O_3$ (338.43)

75 mg. (0.239 mmol) of 17β-OH-(D-homo-SM$_1$) are treated with 0.6 ml. of acetic anhydride and 1.0 ml. of pyridine for 16 hours at room temperature. The mixture is then poured into water, extracted with methylene chloride, and the methylene chloride solution washed with hydrochloric acid and bicarbonate until neutral. After drying, filtering, and concentration of the solution, the product is taken up in 8 ml. of benzene, and boiled with 20 mg. of p-toluenesufonic acid for 12 minutes under reflux. After washing until neutral, drying, filtration, and evaporation of the solution, the product is recrystallized from ethanol. 53 mg. (66%) of 3-methoxy-D-homo-1,3,5(10),8,14 - estrapentaene-17β-ol-acetate are obtained, M.P. 120–121° C.; $\epsilon_{306}$=30700.

EXAMPLE 35

Preparation of 1-methyl-3-methoxy-8(14)-seco-1,3,5(10),9(11)-estratetraene-14α-ol-17-one 1,6 g. of 1-methyl-3-methoxy-8(14)-seco-1,3,5(10),9(11)-estratetraene-14,17-dione are fermented and worked up as described in Example 2(a) in 16 fermentation flasks with *Saccharomyces uvarum* (CBS 1508).

There is obtained 1-methyl-3-methoxy-8(14)-seco-1,3,5(10),9(11)-estratetraene-14α-ol-17-one; M.P. 93/94–95° C., $(\alpha)_D^{20}+23°$ (dioxane, c.=1; $\epsilon_{264}$=20100.

EXAMPLE 36

Preparation of 13β-(n-propyl)-3-methoxy-8(14)-seco-18-nor-1,3,5(10),9(11)-estratetraene-17β-ol-14-one Under the conditions described in Example 22, 3.0 g. of 13β - (n-propyl) - 3 - methoxy-8(14)-seco-18-nor-1,3,5(10),9(11)-estratetraene-14,17-dione are fermented with *Saccharomyces uvarum* (CBS 1508) and worked up. The thus-produced oily raw product is purified in a silica gel column by means of carbon tetrachloride-methylene chloride gradients.

There is obtained 13β-(n-propyl)-3-methoxy-8(14)-seco - 18 - nor-1,3,5(10),9(11)-estratetraene-17β-ol-14-one, in the form of a syrup. $(\alpha)_D^{20}+12.0°$ (dioxane, c.=1).

EXAMPLE 37

Preparation of 1 - methyl - 1-(6-carboxy-3-ketohexyl)-cyclopentan-2-ol-5-one and 4-(2'-carboxyethyl)-8-methyl-4,9-dehydro-hydrindan-1-ol-5-one 4.0 g. 1 - methyl - 1-(6-carboxy-3-ketohexyl)-cyclopentane-2,5-dione ethyl ester are fermented and worked up to a concentrate, under the conditions described in Example 2(a), in 32 fermentation flasks with *Saccharomyces uvarum* (CBS 1508).

Since the 1 - methyl - 1-(6-carboxy-3-ketohexyl -cyclopentan-2-ol-5-one, obtained as a raw product, can be isolated by column chromatography only with difficulties, the concentrate, which is dry, is mixed with 25 ml. 5 N HCl, in order to cyclize the compound, and then heated under reflux for one hour. After the solution has cooled, the reaction mixture is extracted with chloroform, the chloroform phase is washed with a small amount of water, dried with $Na_2SO_4$, and concentrated to dryness under vacuum. The residue is separated in a column filled with acid-washed silica gel by means of chloroform-methanol gradients; this column combines the fractions containing the 4-(2′-carboxyethyl)-8-methyl-4,9-dehydro-hydrindan-1-ol-5-one. The fractions thus combined are concentrated to dryness under vacuum at a bath temperature of 35° C., mixed with a small amount of water, and then crystallized by cooling to 0° C.

There is obtained 4-(2′-carboxyethyl)-8-methyl-4,9-dehydro-hydrindan-1-ol-5-one monohydrate; M.P. 106/108–109° C.; $(\alpha)_D + 28°$ (acetone).

EXAMPLE 38

Preparation of 1-piperonyl-malonic acid monoethyl ester (a) Rac-piperonyl malonic acid monoethyl ester $C_{13}H_{14}O_6$ (molecular weight 266.25).—Starting with piperonyl malonic acid diethyl ester, the synthesis is conducted analogously to the synthesis of rac-$\beta$-(3,4-methylenedioxyphenyl)-glutaric acid monoethyl ester.

There is obtained rac-piperonyl malonic acid monoethyl ester in the form of a syrup.

(b) 1-piperonyl malonic acid monoethyl ester.—1.6 g. piperonyl malonic acid diethyl ester are fermented and worked up under the same conditions as described in Example 28, with *Penicillium albidum* (CMJ 40 290).

There is obtained 1-piperonyl malonic acid monoethyl ester as a syrup. $(\alpha)_D -1.9°$ (dioxane, c.=2).

EXAMPLE 39

Preparation of 1,2-(3,4-methylenedioxybenzyl-propane-1,3-diol-1-acetate (a) 2 - (3,4 - methylenedioxybenzyl)-propane-1,3-diol-diacetate, $C_{15}H_{18}O_6$ (molecular weight 295.31).—2.0 g. piperonyl propanediol are dissolved in 6 ml. dry pyridine; the solution is mixed with 3 ml. acetic anhydride and allowed to stand for 4 hours at room temperature. The mixture is then poured into 40 ml. ice cold 8% aqueous sulfuric acid, stirred for one hour, and extracted with 3 separate portions of 50 cc. ethyl acetate; the ethyl acetate phase is washed with water, bicarbonate solution, and water, dried over $Na_2SO_4$, and evaporated to dryness under vacuum.

There is obtained 2.8 g. 2-(3,4-methylenedioxybenzyl)-propanediol diacetate (100% of theory) as a syrup.

(b) 1,2 - (3,4-methylenedioxybenzyl)-propane-1,3-diol-1-acetate, $C_{13}H_{16}O_5$ (molecular weight 253.28.—800 mg. of the diacetate—dissolved in 40 ml. dimethyl formamide—are fermented under the same conditions as set forth in Example 3(a), using *Achromobacter parvulus* (ATCC 4335) in eight fermentation flasks, and worked up to the crude product. The latter is purified as described in Example 31.

There is obtained 1,2-(3,4-methylenedioxybenzyl)propane-1,3-diol-1′-acetate as a syrup; $(\alpha)_D -3.6°$ (dioxane).

EXAMPLE 40

Preparation of 1-(3-methoxy-8(14)-seco-1,3,5(10),9(11)-estratetraene-14,17-dione-monosemicarbazone)

(a) 3 - methoxy - 8(14)-seco-1,3,5(10),9(11)-estratetraene-14,17-dione-disemicarbazone, $C_{21}H_{28}O_3N_6$ (molecular weight 412.49).—5.0 g. SM are dissolved in 130 ml. ethanol; the solution is mixed with 7.5 g. semicarbazide hydrochloride and 11.2 g. sodium acetate, and shaken for one hour at room temperature. Then, about 150 ml. water are added, and the separated product, after having been allowed to stand at 0° C. for three hours, is vacuum-filtered and recrystallized from ethanol.

There is obtained 4.4 g. 3-methoxy-8(14)-seco-1,3,5 (10),9(11) - estratetraene-14,17-done-disemicarbazone, M.P. 211/212–213° C.

(b) 1 - (3 - methoxy-8(14)-seco-1,3,5(10),9(11)-estratetraene - 14,17 - dione-monosemicarbazone), $C_{20}H_{35}O_3N_3$ (molecular weight 355.44).—6.0 g. of the disemicarbazone—dissolved in 80 ml. dimethyl formamide—are fermented under the same conditions as described in Example 3(h), using *Streptococcus cremoris* 3030 (Bundesforschungsanstalt für Milchwirtschaft, Kiel, Germany), and worked up to the crude product. The latter is purified in a silica gel column by means of methylene chloride-chloroform gradients, and there is obtained 1-(3-methoxy-8(14) - seco-1,3,5(10),9(11)-estratetraene - 14,17 - dione-monosemicarbazone), M.P. 204–205.5° C.; $(\alpha)_{364} -25.5°$ (dioxane).

EXAMPLE 41

Preparation of (—)-3-methoxy-8(14)-seco-1,3,5(10),9(11)-estratetraene-14,17-dione-monosemicarbazone 6.0 g. of 3-methoxy-8(14)-seco-1,3,5(10),9(11)estratetraene-14,17-dione-disemicarbazone are fermented with *Streptococcus lactis* 3021 (Bundesforschungsanstalt für Milchwirtschaft, Kiel, Germany) under the conditions described in Example 40 and worked up. There is obtained (-)-3 - methoxy-8(14)-seco-1,3,5(10),9(11)-estratetraene-14,17-dione-monosemicarbazone, M.P. 203–205° C.; $(\alpha)_{364} = -23°$.

EXAMPLE 42

Preparation of 6-thia-8(14)-seco-1,3,5(10),9(11)-estratetraene-14$\alpha$-ol-17-one 3.2 g. of 6 - thia-8(14)-seco-1,3,5(10),9(11)-estratetraene-14,17-dione—dissolved in 320 ml. of ethanol—are fermented under the same conditions as described in Example 2(a) for 16 hours, using *Saccharomyces uvarum* (CBS 1508), in 32 fermentation flasks (each 500 ml.), and worked up to the crude product. The latter is purified in a silicagel column by means of hexan-acetone gradients, and there is obtained 6-thia-8(14)-seco-1,3,5 (10),9(11)-estratetraene-14$\alpha$-ol-17-one in the form of syrup; $(\alpha)_D = +27°$ (dioxane, c.=1).

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably and intended to be, within the full range of equivalence.

What is claimed is:

1. A process for the conversion of an optically inactive compound of the formula

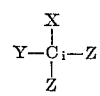

wherein $C_i$ is a symmetrical carbon atom thereof and wherein X is a member of the group consisting of H, methyl, ethyl and propyl, the two Z groups are identical aliphatic groups which are separate or joined together, each of which contains one to four carbon atoms and additionally a functional group containing nitrogen and/or oxygen which is convertible to another functional group by one of oxidation, reduction, esterification, saponification and ketone regeneration of a ketonic functional derivative, wherein, when X is methyl and the two Z groups are joined together, the said functional group is other than a keto group, and Y is the organic remainder of the molecule; to an optically active antipode of the formula

wherein $C_a$ is an asymmetrical carbon atom thereof corresponding to $C_i$ of the optically inactive compound, X, Y, and Z have the values given above and Z' is a ligand otherwise corresponding to Z bearing a functional group which differs from the functional group of Z, which process comprises subjecting the said optically inactive compound to the microbiological enzyme system of a bacteria, fungi or yeast, thereby converting the symmetrical carbon atom $C_i$ to the asymmetrical carbon atom $C_a$ by conversion of only one of said functional groups present on the Z groups of the optically inactive compound to a different functional group, and recovering the thus-produced optically active antipode.

2. A process according to claim 1 wherein X is H.
3. A process according to claim 1 wherein X is ethyl.
4. A process as defined by claim 1 wherein the starting compound is of the formula

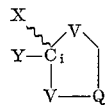

wherein $C_i$, X and Y have the values given above, Q is —$CH_2$— or —$CH_2CH_2$— and V is a keto group in free form or in the form of an oxime, hydrazone or semicarbazone.

5. A process as defined by claim 4 wherein Q is —$CH_2CH_2$— and V is a keto group in free form.
6. A process as defined by claim 4 wherein X is —$C_2H_5$, V is a keto group in free form and Y is

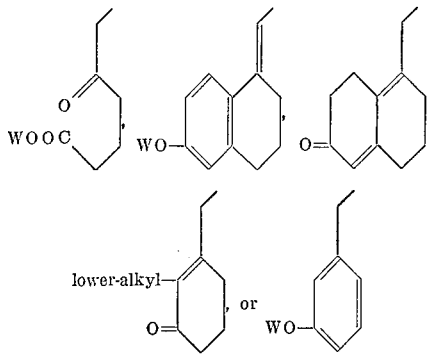

in which W is hydrogen or lower-alkyl.

7. A process according to claim 1, characterized by starting with 3-methoxy - 8(14) - seco-1,3,5(10),9(11)- estratetraene-14,17-dione.
8. A process according to claim 1, characterized by starting with 13β - ethyl - 3 - methoxy-8(14)-seco-18-nor-1,3,5(10),9(11)-estratetraene-14,17-dione.
9. A process according to claim 1 wherein the starting compound is 3 - methoxy-8(14)-seco-D-homo-1,3,5(10), 9(11)-estratetraene-14,17α-dione.
10. A process according to claim 1 wherein the starting compound is 2-methyl - 3 - methoxy - 8(14)-seco-1, 3,5(10),9(11)-estratetraene-14,17-dione.
11. A process according to claim 1 wherein the starting compound is 4-methyl - 3 - methoxy-8(14)-seco-1,3, 5(10),9(11)-estratetraene-14,17-dione.

12. A process according to claim 1 wherein the starting compound is β-(3,4 - methylenedioxyphenyl)-glutaric acid diethyl ester.
13. A process according to claim 1 wherein the starting compound is β-(3,4 - methylenedioxyphenyl)-glutaric acid dimethyl ester.
14. A process according to claim 1 wherein the starting compound is 3-(3,4-methylenedioxyphenyl)-pentane-1,5-diol.
15. A process according to claim 1 wherein the starting compound is 2-(3,4-methylenedioxybenzyl)-propane-1,3-diol.
16. A process according to claim 1, characterized by the enzymatic conversion of one keto group being brought about by means of fungi, such as *Aspergillus ochraceus, Aspergillus niger, Curvularia lunata, Rhizopus nigricans* or *Penicillium notatum*, or the enzymes which may be produced from these, or by means of yeasts, such as *Saccharomyces cerevisiae, Saccharomyces carlsbergensis, Saccharomyces pastorianus, Saccharomyces ellipsoides*, or the enzymes which may be produced from these, or by means of bacteria, such as *Bacillus esterificans, Bacillus, laterosporus, Brevibacterium vitarum, Propionibacterium arabinosum, Protaminobacter alboflavus, Mesentericus* spec., *Mycoplana dimorpha, Bacillus thuringiensis*, or the enzymes which may be produced from these.
17. A process according to claim 6, characterized by using *Saccharomyces uvarum* (CBS 1508), *Bacillus thuringiensis* (BBA—Darmstadt), or *Arthrobacter simplex* (ATCC 6946) for the selective enzymatic reduction of one keto group.
18. A process as defined by claim 1, characterized by enzymatically saponifying one carboxyl ester structure.
19. A process as defined by claim 1, characterized by enzymatically saponifying one carboxylic acid amide structure.
20. A process as defined by claim 1, characterized by enzymatically reducing one carboxyl or aldehyde group.
21. A process as defined by claim 1, characterized by enzymatically reducing one keto group.
22. A process as defined by claim 1, characterized by enzymatically oxidizing one hydroxyl group.
23. A process as defined by claim 1, characterized by enzymatically oxidizing one aldehyde group.
24. A process as defined by claim 1, characterized by enzymatically reducing one nitro group.
25. A process as defined by claim 1, characterized by enzymatically decomposing one oxime, hydrazone, or semicarbazone group, to the keto group.
26. A process as defined by claim 1, characterized by enzymatically reducing one oxime, hydrazone, or semicarbazone group to the corresponding amino group.
27. A process as defined by claim 1, characterized by enzymatically acetylating one hydroxyl group.
28. A process as defined by claim 1, characterized by enzymatically acetylating one amino group.

References Cited

UNITED STATES PATENTS

| | | | |
|---|---|---|---|
| 3,102,080 | 8/1963 | Raspe et al. | 195—51 |
| 3,281,330 | 10/1966 | Fonken et al. | 195—51 |
| 3,304,323 | 2/1967 | Fonken et al. | 195—51 |

OTHER REFERENCES

West and Todd, Textbook of Biochemistry, 3rd edition, page 911 (1961).

ALVIN E. TANENHOLTZ, Primary Examiner

U.S. Cl. X.R.

195—28, 29, 30, 49; 260—340.5, 397.5, 488, 515, 554, 586

UNITED STATES PATENT OFFICE
CERTIFICATE OF CORRECTION

Patent No. 3,562,112                    Dated February 9, 1971

Inventor(s)    Heinz Gibian, et al.

It is certified that error appears in the above-identified paten and that said Letters Patent are hereby corrected as shown below:

Column 11, Line 65, change "shaken for days" to ---shaken for 2 days---

Column 11, Line 71, change "ehanolic" to ---ethanolic'

Column 14, Line 24, change "crystalline" to ---crystal

Column 21, Line 44, change "and 2 cc." to ---and 20 cc

Column 22, Line 10, change "(6)" to ---(a)---

Column 22, Line 33, delete entire line, starting with "analyogously to that of rac -β-(3,4-methylenedioxy)"

Signed and sealed this 24th day of August 1971.

(SEAL)
Attest:

EDWARD M. FLETCHER, JR.          WILLIAM E. SCHUYLER, JR.
Attesting Officer                Commissioner of Patents